March 20, 1956  L. SILVERMAN ET AL  2,738,669
LEAKAGE MEASURING APPARATUS
Filed Jan. 5, 1952

INVENTOR.
Leslie Silverman
BY George Lee

ATTORNEY

United States Patent Office 2,738,669
Patented Mar. 20, 1956

2,738,669
LEAKAGE MEASURING APPARATUS

Leslie Silverman, Dover, and George Lee, Canton, Mass., assignors to the United States of America as represented by the Secretary of the Army Application January 5, 1952, Serial No. 265,146

1 Claim. (Cl. 73—40)

The invention described herein may be manufactured and used by or for the Government for governmental purposes without the payment to us of any royalty thereon.

The invention relates generally to dynamic leakage measuring apparatus and particularly to apparatus for measuring the dynamic leakage of respirator facepieces and valves.

It is an object of this invention to provide apparatus which measures the dynamic leakage of respirator facepieces and valves under conditions which approximate the actual conditions of use of the tested object.

It is a further object of this invention to provide dynamic leakage measuring apparatus which includes structure for detecting gross leakage in the tested object and additional structure for detecting minute leakage.

It is a specific object of this invention to provide dynamic leakage measuring apparatus for gas masks which approximates the actual conditions of a gas mask in use in that inhalation and exhalation is simulated and wherein it is possible to separately determine the amount of leakage during inhalation and the amount of leakage during exhalation.

It is a further specific object of this invention to provide dynamic leakage measuring apparatus for gas masks and valves which simulates actual conditions of use of said objects and which includes an automatic soap-film generator.

It is a very specific object of this invention to provide a novel, automatic soap-film generator.

Other objects and advantages will appear from the specification and drawings wherein like reference characters indicate corresponding parts throughout the views, and wherein.

Figure 1:
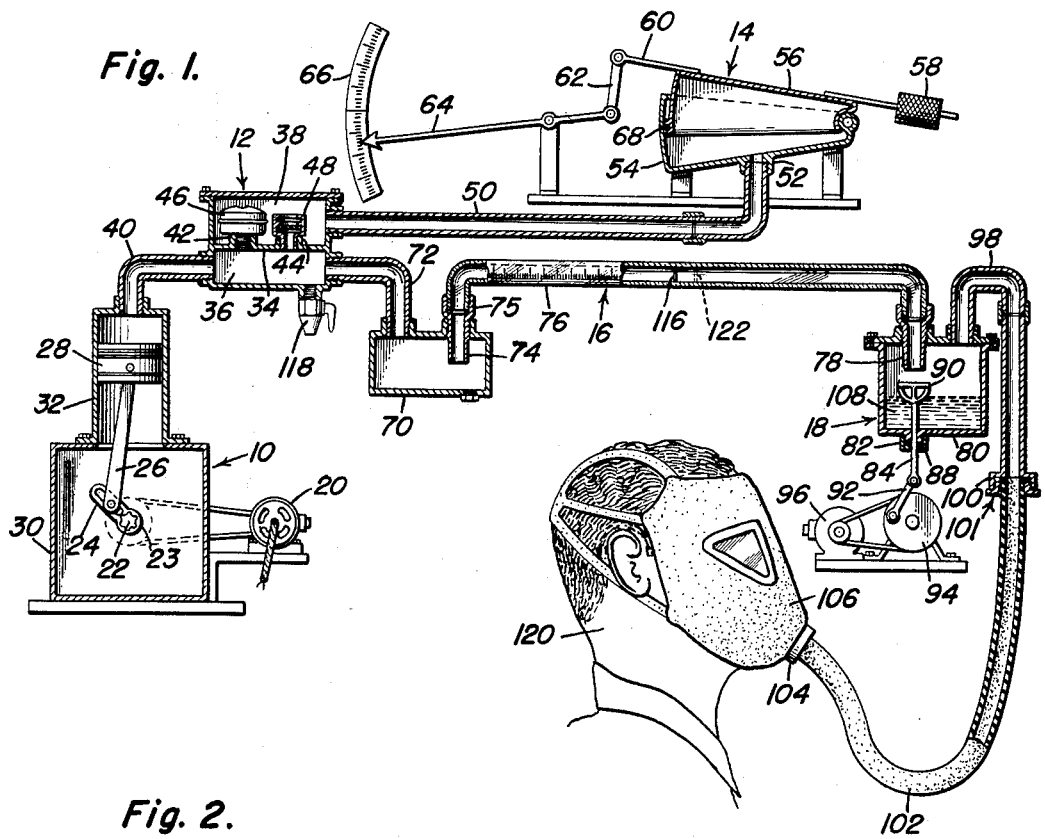
Fig. 1 is a sectional view taken through the apparatus with portions shown in elevation.

Referring to the drawings in detail, the apparatus broadly comprises the following mean units: a respiration pump 10, a canister and outlet valve chamber 12, a low inertia, counterbalanced Krogh-type gasometer 14, a soap-film gasometer system 16, and an automatic soap-film generator 18.

Respiration pump 10, which is shown somewhat schematically in Fig. 1, is a conventional, power-operated pump which may be adjusted to any desired speed and volume. For purposes of illustration, variable speed motor 20 drives crank shaft 22, crank 23 and its associated crank arm 24, which is coupled to piston rod 26 of piston 28. Airtight casing 30 includes a cylindrical portion 32 which slidably receives the piston 28. For purposes of illustration, the connection between piston rod 26 and crank arm 24 is shown as a conventional pin and slot coupling. The stroke of piston 28 may be set to any desired length by adjusting the point at which the pin of piston rod 26 is secured in the slot of crank arm 24.

Horizontal wall 34 divides canister and outlet valve chamber 12 into two subchambers, lower chamber 36 and upper chamber 38. The lower chamber 36 communicates with the upper portion of cylindrical portion 32 of casing 30 through tube 40. The dividing wall 34 has two internally threaded, apertured bosses 42 and 44 formed therein. A conventional gas mask canister 46 is secured in boss 42, and a conventional gas mask outlet valve 48 is secured in boss 44. The upper chamber 38 communicates with the low inertia, counterbalanced gasometer 14 through tube 50. Tube 50 is connected to the boss 52 formed on the gasometer base 54 and communicates with the interior thereof. Gasometer 14 is of the conventional Krogh-type and generally comprises the aforementioned base 54, the pivoted cover 56 to which is attached a counter-balance 58, and linkage 60 and 62 which connects to pivoted indicator 64 which is associated with calibrated scale 66. The juncture of gasometer base 54 and cover 56 is appropriately sealed by seal 68.

Manually operable valve 118 is secured in the lower wall of lower chamber 36. This valve is adapted to vent lower chamber 36 to the atmosphere. The lower chamber 36 communicates with the upper portion of soap trap 70 through tube 72. Soap-film breaker 74 depends into the interior of soap trap 70 and is removably connected to the calibrated tube 76 at its upper internally threaded end 75. Calibrated tube 76 is removably attached to and communicates at its other end with soap-film receiving tube 78 which depends into soap-film generator reservoir 80. Apertured boss 82 is formed in the bottom wall of reservoir 80 and slidably receives reciprocable rod 84. The opening in boss 82 is rendered airtight by packing 86 and packing nut 88. The upper end of rod 84 supports soap-film producing ring 90 which will be described more fully subsequently, within the reservoir 80, and its lower end is pivotably connected to connecting rod 92. Connecting rod 92 is pivotably connected to crank 94 which is driven by variable speed motor 96 in a conventional manner.

Adapter tube 98 communicates with the interior of reservoir 80 through the top wall thereof at one of its ends and has coupling portion 100 of coupling 101 formed at its other end. Coupling 101 may be of any conventional type such as a bayonet or plug type. If a valve is to be tested, it is mounted in coupling 101, however, if a gas mask is to be tested, a flexible hose 102 is connected to tube 98 at coupling 101. Hose 102 has a gas mask connector 104 formed on its free end which is adapted to be coupled to gas mask facepiece 106.

Figure 2:
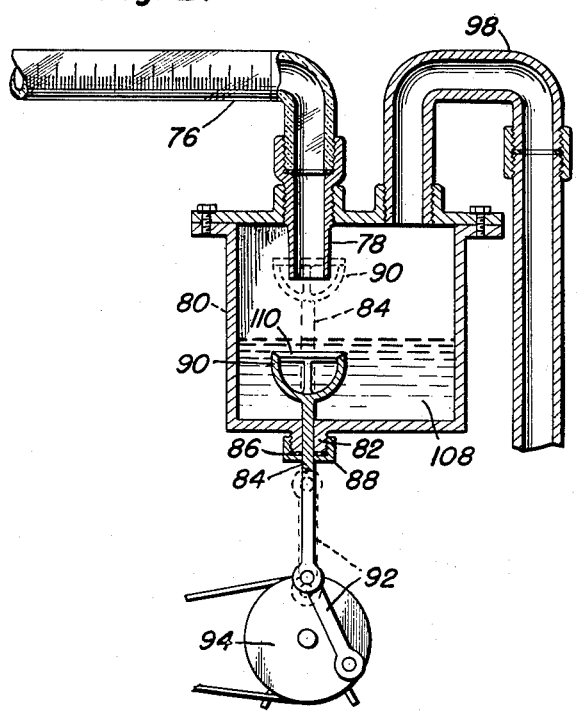
Fig. 2 is an enlarged view of a portion of Fig. 1 showing some of the movable parts in two positions.
Figure 3:
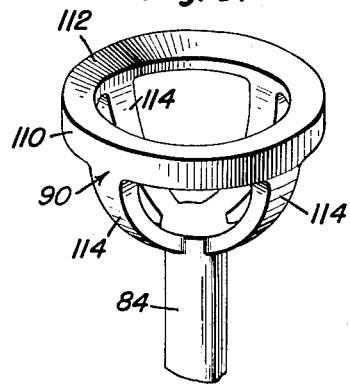
Fig. 3 is a perspective view of one of the elements.

Prior to operation of the apparatus, the following preliminary steps are taken: Soap solution 108, such as Aerosol OT wetting agent, is placed in reservoir 80 of the soap-film generator up to a level which is midway of the lowermost position (shown in solid lines in Fig. 2) of soap-film producing ring 90 and the uppermost position (shown in dotted lines in Fig. 2) of said ring. The pump 10 is set to a speed and volume which corresponds to the respiration rate and volume desired to be simulated, and turned on. The motor 96 of the soap-film generator 18 is turned on causing the crank 94 to rotate, the connecting rod 92 to oscillate and the rod 84 to reciprocate. As the rod 84 moves downwardly the ring 90 is immersed in the soap solution 108; upon moving upwardly the ring 90 carries a film of soap across its annular portion 110. It has been found that to be most effective, the soap-film producing ring 90 should be concavely beveled on its upward inner edge 112, and it should be secured to the rod 84 by arcuately bent wires 114 (see Fig. 3). As the ring 90 approaches depending tube 78 the soap-film is deposited across the mouth of said tube. The film of soap is drawn up into the calibrated tube 76 to a convenient position such as 116 (see Fig. 1) by opening manually operable valve 118 and shutting off pump 10. This vents the lower chamber 36 to the atmosphere and allows the air in tubes 98, 102 and in the respirator facepiece to move toward the open valve and thereby urge the soap-film up depending tube 78, into calibrated tube 76 and toward the left in said calibrated tube. When the soap-film reaches the desired point (such as 116) the valve 118 is closed. If several spaced soap-films are desired, the soap-film generator is allowed to operate while the valve 118 is open; if only one soap-film is desired, the soap-film generator is turned off after one soap-film is formed on the depending tube 78. During the preliminary step of positioning a soap-film in the calibrated tube 76, the facepiece may be on a living subject who is holding his breath or the tube 102 may be closed (by crimping the hose or otherwise).

With the pump 10 properly set, the soap-film 116 properly positioned, and the soap-film generator 18 shut off, the actual test of a facepiece or valve can be made. Assuming that a facepiece is being tested, the facepiece is mounted on a living subject 120 and he is instructed to hold his breath (30 to 45 seconds is ample). The pump 10 is turned on and inspiration and expiration is simulated by the upward and downward movement of the piston 28. As the piston moves downwardly, inspiration is simulated and the following occurs: air flows out of gasometer 14, through tube 50, into upper chamber 38, through canister 46 and into lower chamber 36 causing a decrease in volume of air in the apparatus on the upper side of dividing wall 34 which is registered by pointer 64 on calibrated scale 66, and an increase in pressure in the portions of the apparatus below the dividing wall 34 which is transmitted through tube 72, soap trap 70, calibrated tube 76, reservoir 80 and tubes 98 and 102 to the interior of the facepiece 106.

When piston 28 moves upwardly, expiration is simulated and the following occurs: air passes out of the lower portion of the apparatus through the outlet valve 48 into the upper chamber 38, through tube 50 and into gasometer 14 increasing the volume therein, which causes the pointer 64 to move. Leakage in the facepiece may be detected in several ways. Gross leaks of the order of 20 to 30 ml. may be quickly detected by reading the gasometer scale 66 before and after one complete cycle. If a gross leak exists the pointer 64 will not return to its original position. Another method to detect a gross leak would be to observe the movement of the pointer 64 during a stroke of the piston. Since the volume per stroke of the pump is known, it can be compared to the change in volume of the gasometer per stroke. Both of these methods are useful in detecting gross leaks, however, in order to detect slight leaks it is necessary to observe the movement of a soap-film such as soap-film 116 in the calibrated tube 76. Soap-film 116 will normally oscillate during the simulated breathing cycle for the dead space in the facepiece will vary according to the pressure therein because the facepiece is constructed of a resilient material such as rubber. Any movement in excess of this normal oscillation represents leakage. This may be detected after a complete cycle for if there is any leakage the soap-film will not return to its original position. For example: there would be leakage if the soap-film 116 was positioned at point 122 after one complete cycle. The actual amount of leakage during the cycle is equal to the volume of air in tube 76 between the positions 116 and 122. A further refinement in the use of our apparatus is that it separately indicates the amount of leakage on inspiration and the amount on expiration. This is accomplished by noting with an airtight facepiece of the same design as the facepiece being tested the points between which the soap-film normally oscillates. Since the soap-film moves in one direction on inspiration and toward the other on expiration, each point will represent the normal extreme position (either right or left) for the particular phase of breathing. With this knowledge, the extreme points of the oscillation of the facepiece to be tested, may be compared to the extreme points of oscillation of the airtight facepiece. If on one phase of breathing with the facepiece to be tested the soap-film moves further in one direction than it did with the airtight facepiece, the excess movement represents leakage on that phase of breathing. On the next phase of breathing, the soap-film will move back toward its original position; if there is leakage, it will not reach its original position after the phase is completed. The volume of air between the original and final position of the soap-film represents total leakage for the cycle; by subtracting the known leakage of the first phase of breathing from the total leakage for the cycle, the leakage for the second phase of breathing can be obtained.

This apparatus may be used to test for leakage in inspiratory or expiratory valves by inserting the valve in coupling 101 and placing the coupling end of tube 98 in a chamber having a fixed leak. This leak may be caused by a small orifice or a needle valve and should be of such magnitude that a small amount of flow is permitted per respiration while not allowing any back pressure to build up in the chamber. Assuming that an expiratory valve is being tested, the purpose of the test is to determine the back leakage through the valve during inspiration. With the apparatus set as in the case where a facepiece is tested, the pump 10 is turned on. As the piston 28 moves upwardly, expiration is simulated and air will flow out the valve under test into the chamber and leak out said chamber. During this activity, soap-film 116 will be displaced an amount equal to the volume of the fixed leak in the chamber. When piston 28 moves downwardly, inspiration is simulated and the soap-film 116 will move back an amount equal to the back leakage. Inspiratory valves may also be tested with this apparatus in a similar manner.

One of the salient features of our invention is the automatic soap-film generator. Although it has been illustrated and described as being a part of the dynamic leakage measuring apparatus it should be noted that it may be used generally wherever it is desired to produce soap-films and deposit them in a tube or similar article, and particularly in apparatus for investigating fluid pressure and fluid flow.

From the above description, it will be apparent that a dynamic leakage measuring apparatus has been provided which fulfills each of the objects of this invention. While we have illustrated a particular embodiment of our invention, we do not intend thereby to limit ourselves to the exact details of construction set forth for the invention embraces such changes and modifications that come within the scope and spirit of the appended claim.

We claim:

In leakage measuring apparatus, the combination of a respiration pump, a chamber having a wall therein which divides the chamber into a first and second sub-chamber, a canister and an outlet valve mounted in said dividing wall and being the only means of communication between said sub-chambers, said pump communicating with said first sub-chamber through a tube, a manually operable valve in a wall of said first sub-chamber, said second sub-chamber communicating through a tube with a counterbalanced gasometer, said first sub-chamber communicating with a soap trap, a transparent calibrated tube having one of its ends depending into said soap trap, and its other end depending into a soap solution reservoir, soap solution in said reservoir, a vertically movable soap-film producing ring in said reservoir which is adapted to be moved from one position wherein it is immersed in said soap solution to another wherein it surrounds the depending portion of said calibrated tube, means for moving said ring, and an adapter tube communicating with said reservoir and adapted to be coupled to a respirator component which is to be tested.

References Cited in the file of this patent

UNITED STATES PATENTS

| | | |
|---|---|---|
| 1,719,787 | Smith | July 2, 1929 |
| 2,270,447 | Jones et al. | Jan. 20, 1942 |
| 2,412,732 | Holman | Dec. 17, 1946 |

FOREIGN PATENTS

| | | |
|---|---|---|
| 51,056 | France | Apr. 22, 1941 |